United States Patent
Gammons et al.

(10) Patent No.: US 10,197,257 B2
(45) Date of Patent: Feb. 5, 2019

(54) LIGHTING SYSTEM AND CONTROL THEREOF

(71) Applicant: Rotolight Limited, London (GB)

(72) Inventors: Roderick Allen Gammons, Staines Upon Thames (GB); Andrew Francis, Witham (GB); Roderick Aaron Gammons, Winkfield (GB); Stefan Lange, Shepperton (GB)

(73) Assignee: Rotolight Limited, London (GB)

( * ) Notice: Subject to any disclaimer, the term of this patent is extended or adjusted under 35 U.S.C. 154(b) by 0 days.

(21) Appl. No.: 15/820,469

(22) Filed: Nov. 22, 2017

(65) Prior Publication Data

US 2018/0094798 A1 Apr. 5, 2018

Related U.S. Application Data

(63) Continuation of application No. 15/481,460, filed on Apr. 7, 2017.
(Continued)

(30) Foreign Application Priority Data

Apr. 20, 2016 (GB) .................................. 1606907.2

(51) Int. Cl.
*F21V 23/00* (2015.01)
*H05B 37/02* (2006.01)

(52) U.S. Cl.
CPC ......... *F21V 23/003* (2013.01); *H05B 37/029* (2013.01); *H05B 37/0254* (2013.01); *H05B 37/0272* (2013.01)

(58) Field of Classification Search
CPC .. H05B 37/02; H05B 37/0272; H05B 37/029; H05B 37/0281; H05B 33/08; H05B 33/0842; F21V 23/00; F21V 23/003
See application file for complete search history.

(56) References Cited

U.S. PATENT DOCUMENTS 5,307,295 A 4/1994 Taylor et al.
5,921,659 A 7/1999 Hunt et al.
(Continued)

FOREIGN PATENT DOCUMENTS

CN 202841602 3/2013
CN 103090238 5/2013
(Continued)

OTHER PUBLICATIONS

European Search Report and the European Search Opinion dated Aug. 1, 2017 From the European Patent Office Re. Application No. 17165609.3. (7 Pages).
(Continued)

*Primary Examiner* — Thai Pham

(57) ABSTRACT

A method for controlling a lighting device to produce a range of user customizable realistic lighting effects for videography, broadcasting, cinematography, studio filming and/or location filming is disclosed. The method comprises: calculating a time varying lighting value based on at least one simulation parameter; wherein said at least one simulation parameter for characterizing a lighting effect is at least one of: a random brightness; a random duration; and a random interval; said simulation parameter depending on the lighting effect being simulated and outputting said time varying lighting value thereby to simulate a lighting effect.

21 Claims, 5 Drawing Sheets

Related U.S. Application Data

(60) Provisional application No. 62/319,809, filed on Apr. 8, 2016.

(56) References Cited

U.S. PATENT DOCUMENTS

| | | | | |
|---|---|---|---|---|
| 5,924,784 | A | * | 7/1999 | Chliwnyj .................. F21S 9/02 307/64 |
| 7,038,399 | B2 | * | 5/2006 | Lys .................... H05B 33/0809 315/291 |
| 7,353,071 | B2 | | 4/2008 | Blackwell et al. |
| 7,777,427 | B2 | | 8/2010 | Stalker, III |
| 8,253,666 | B2 | | 8/2012 | Shteynberg et al. |
| 2004/0257007 | A1 | | 12/2004 | Lys et al. |
| 2007/0159347 | A1 | * | 7/2007 | Weitzel .................... G08B 5/36 340/691.2 |
| 2008/0129226 | A1 | * | 6/2008 | DeWitt ................ H05B 37/029 315/307 |
| 2014/0139130 | A1 | | 5/2014 | Upton |
| 2017/0343197 | A1 | | 11/2017 | Gammons et al. |
| 2018/0112862 | A1 | | 4/2018 | Gammons et al. |
| 2018/0135842 | A1 | | 5/2018 | Gammons et al. |

FOREIGN PATENT DOCUMENTS

| | | |
|---|---|---|
| CN | 103313457 | 9/2013 |
| CN | 103313458 | 9/2013 |
| EP | 2120512 | 11/2009 |
| EP | 2383608 | 11/2011 |
| EP | 3002995 | 4/2016 |
| GB | 2209229 | 5/1989 |
| GB | 2424525 | 9/2006 |
| GB | 2482562 | 2/2012 |
| JP | H0448588 | 2/1992 |
| WO | WO 01/05195 | 1/2001 |
| WO | WO 2005/052751 | 6/2005 |
| WO | WO 2017/097741 | 6/2017 |

OTHER PUBLICATIONS

Patents Act 1977: Combined Search and Examination Report Under Sections 17 and 18(3) dated Jun. 13, 2016 From the Intellectual Property Office of the United Kingdom Re. Application No. GB1606907.2. (7 Pages).
Patents Act 1977: Examination Report under Section 18(3) dated Aug. 30, 2017 From the Intellectual Property Office of the United Kingdom Re. Application No. GB1606907.2 (3 Pages).
Official Action dated Mar. 9, 2018 From the US Patent and Trademark Office Re. U.S. Appl. No. 15/481,460. (9 pages).
Official Action dated Mar. 22, 2018 From the US Patent and Trademark Office Re. U.S. Appl. No. 15/849,793. (14 pages).
Official Action dated Mar. 28, 2018 From the US Patent and Trademark Office Re. U.S. Appl. No. 15/849,819. (17 pages).
Philips "Controlling LED Lighting: Transform Environments, Provide Confort and Security, Save Energy", Philips Color Kinetics, Product Catalog, p. 1-36, 2011.

* cited by examiner

| Light control system | |
|---|---|
| Fire effect | |
| Parameter | Setting |
| More info<br>Fire activity | Low ────●──── High |
| More info<br>Fire colour | 2000K |
| More info<br>Peak brightness | 80% |
| More info<br>Baseline brightness | 40% |
| More info<br>Camera frequency | 60Hz |
| Colour Swing Blue | Monochrome |

LIGHTING SYSTEM AND CONTROL THEREOF

RELATED APPLICATIONS

This application is a Continuation of U.S. patent application Ser. No. 15/481,460 filed on Apr. 7, 2017, which claims the benefit of priority of U.S. Provisional Patent Application No. 62/319,809 filed on Apr. 8, 2016, and United Kingdom Patent Application No. 1606907.2 filed on Apr. 20, 2016. The contents of the above applications are incorporated herein by reference in their entirety.

FIELD AND BACKGROUND OF THE INVENTION

This invention relates to a lighting system, and the control of a lighting system, and the simulation of lighting special effects, and in particular to a lighting system for videography, broadcasting and cinematography.

In the film, broadcast and TV industry a lighting controller called a 'flicker box' which is independent of a lighting device, is used to produce flickering light effects to mimic flickering light for example from a fire place, candle, electrical spark or lightning for on set television/broadcast production use.

The flicker effect provided by these devices is typically created using the analogue circuitry modulators contained within the 'flicker box', controlled manually by dials and levers. Use of a flicker box is typically a complex, costly and time consuming process that requires the setup, connection and control of multiple pieces of hardware typically including external Digital Multiplex (DMX) and power distribution devices, as well as typically requiring a physical wired connection to the 'hot' light source desired to be controlled.

Typically such 'flicker boxes' require specialist knowledge and understanding to operate and remain inaccessible or 'out of reach' to lower budget television productions.

Furthermore, many 'flicker boxes' are incompatible with LED light sources, and such systems require the use of 'hot' incandescent light sources which are energy inefficient and also pose health and safety risks to those working on set, typically therefore requiring qualified lighting gaffers and operators.

An improved solution is desired.

According to one aspect of the invention, there is provided a method for controlling a lighting device to produce user customisable lighting effect, the method comprising: calculating a time varying lighting value based on at least one simulation parameter; and outputting said time varying lighting value thereby to simulate a lighting effect.

Optionally, the method may further comprise receiving said at least one simulation parameter for characterising a lighting effect.

Optionally, said at least one simulation parameter for characterising a lighting effect is random.

Optionally, said at least one simulation parameter for characterising a lighting effect is random within predefined boundaries.

Optionally, the random simulation parameter is determined in dependence on one or more user-selectable simulation parameters.

Optionally, the random simulation parameter is in a range determined in dependence on one or more user-selectable simulation parameters.

Optionally, the simulation parameter is a colour or colour temperature.

Optionally, the colour or colour temperature varies in dependence on a brightness lighting value.

Optionally, the simulation parameter is related to one or more of: a rate of increase of brightness; a rate of decrease of brightness; a rate of change of colour; a brightness; a local maximal brightness; a local minimal brightness; a brightness fluctuation period; and a colour fluctuation period.

Optionally, the method may further comprise receiving a user input of one or more user-selectable simulation parameters and adapting the simulation in dependence on the one or more user-selectable simulation parameters.

Optionally, the simulation parameter comprises at least one of: a maximum brightness; a minimum brightness; a colour; a fluctuation period; and a trigger.

Optionally, the simulation parameter comprises a camera recording frequency.

Optionally, the time varying lighting value is calculated so as to vary at a slower rate than said camera recording frequency.

Optionally, the simulation iterates through repeated cycles of receiving at least one random simulation parameter and simulating the lighting effect.

Optionally, the lighting effect is designed to mimic at least one or more of: fire flickering; police light; television; lightning flashing; electrical sparking; and fireworks.

Optionally, the lighting value comprises brightness and/or colour data.

Optionally, the method may further comprise converting brightness and/or colour data into lighting signals and outputting the lighting signal data.

Optionally, the method may further comprise controlling one or more light in dependence on the output.

Optionally, the controlling comprises changing the brightness and/or colour of the light.

Optionally, the method may further comprise receiving a definition of a trigger event, said trigger event initiating said output of the time varying lighting value thereby to simulate a lighting effect.

Optionally, the method may further comprise detecting an occurrence of the trigger event and outputting said time varying lighting value thereby to simulate a lighting effect.

Optionally, the method may further comprise storing the calculated lighting value.

A method according to any of the preceding claims, wherein the controlling is for a lighting system for videography, broadcast, cinematography, studio filming and/or location filming.

Optionally, the method may further comprise controlling a plurality of lights in dependence on the output.

Optionally, the said plurality of lights output different lighting values so as to simulate a lighting effect.

Optionally, the output of said plurality of lights is offset in time.

Optionally, the output of said plurality of lights overlap with one-another so as to simulate a moving light source.

Optionally, one light is a master light and the others of said plurality of lights are slaves.

According to another aspect there is provided a controller for controlling a lighting device to produce a lighting effect, the controller comprising: a calculating device adapted to calculate a time varying lighting value based on at least one simulation parameter; and an output adapted to control a lighting device according to the determined variation of lighting over time.

Optionally, the controller may further comprise a random number source adapted to provide a random number for producing a random simulation parameter for characterising a lighting effect.

Optionally, the controller is adapted to control a plurality of lighting devices in dependence on the time varying lighting value.

Optionally, the controller comprises a wireless communication interface adapted for wireless communication with one or more lighting devices.

Optionally, the controller comprises an input interface adapted to receive a user input.

Optionally, the input interface comprises at least one of: a wireless communication interface; a dial; a slider; a display and buttons; and a touch screen.

Optionally, the controller may further comprise a converter adapted to convert brightness and/or colour data from the simulator into lighting signals for output by the output.

Optionally, the controller may be adapted to perform a method as described herein.

According to another aspect there is provided a lighting system comprising a controller as described herein and at least one lighting device.

Optionally, said controller and said lighting device are integrated in a combined unit.

Optionally, the lighting system may further comprise a further lighting device separate from said controller.

Optionally, the lighting device is a lighting device for videography, broadcast, cinematography, studio filming and/or location filming.

According to another aspect there is provided a lighting device comprising a controller as described herein.

Optionally, the lighting device is a lighting device for videography, broadcast, cinematography, studio filming and/or location filming.

According to another aspect there is provided a computer program product for controlling a lighting device to produce a lighting effect, the computer program product adapted to perform, when executed, the steps of: calculating a time varying lighting value based on at least one simulation parameter; and outputting said time varying lighting value thereby to simulate a lighting effect.

Optionally, the computer program product may be adapted to perform, when executed, the steps of a method as described herein.

According to another aspect of the invention there is provided a controller for controlling a lighting device to produce a lighting effect, the controller comprising: a calculating device adapted to calculate a time varying lighting value based on at least one simulation parameter; and an output adapted to control a lighting device according to the determined variation of lighting over time.

In a further aspect of the present invention there is provided a light with the built-in capability to generate a range of customizable cinematic special lighting effects, by modulating the speed, duration, power/brightness, and/or colour temperature of the light output.

Preferably, the parameters of the effects including but not limited to speed, duration, power/brightness and colour temperature can be controlled locally via a simple user interface on the light itself.

Preferably, the start/stop "triggering" of the effects can be controlled locally via a simple user interface on the light itself, remotely via WiFi, Bluetooth, Zigbee or wireless DMX from a smart phone or tablet, or from a wired 3.5 mm minijack remote trigger, or a wired DMX trigger.

Preferably, the parameters of the effects can be controlled remotely via WiFi, Bluetooth, Zigbee or wireless DMX from a smart phone or tablet.

Preferably, the parameters of the effects can be controlled Via a serial communications interface (eg. RS232, USB or DMX) from a PC running custom lighting control software.

Preferably, the light source containing in built special effects is in the form of an LED lighting fixture. Alternatively it is in the form of or 'hot' light incandescent fixture.

Preferably, multiple lights may be connected together via wired DMX, or via WiFi, Bluetooth, Zigbee or wireless DMX to produce a synchronised large area special effect.

Preferably, when multiple lights are connected together to produce a synchronized large area special effect, the interrelationship of those connected lights is customizable so as to allow all of the connected devices to fire at the same time if desired, or, to enable a staggered effect to take place over an extended time duration and with customizable power intensity, in order to create the effect that a static object is moving as the lights "chase" around a scene.

Preferably, the system includes rolling shutter compensation enabling the minimum light pulse width to be adjusted to suit the shutter speed or frame rate of the user's camera in order to prevent 'strobing' due to the light effect being out of phase/sync with the frame rate of the camera, ensuring that each frame captured by the camera is fully illuminated.

Preferably, a light source can be designated as a 'master', and have connected 'slave' light sources which fire in synchronization with the 'master', or in a customizable sequence, with regard duration, power and/or colour temperature.

Preferably, the 'slave' light sources are connected to the 'master' light source via wired DMX, wireless DMX, wifi, Bluetooth, or RS232 sync cable.

Preferably, the light contained in built special effects, can be powered both from mains power, and/or via its own internal battery power source, providing greater flexibility and portability for location shooting.

Preferably, the light source is capable of producing customisable effects including, but not limited to: Fire, Lightning, Police light, TV simulation, Neon Flickering sign, Muzzle (gunshot), Welding, Spark/Short Circuit, Scan (e.g. fingerprint scanner), Papparrazi flashes, Propeller, (Nuclear) Explosion and Wormhole.

The invention extends to any novel aspects or features described and/or illustrated herein.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention extends to methods and/or apparatus substantially as herein described with reference to the accompanying drawings.

The invention will now be described by way of example, with references to the accompanying drawings in which:

FIG. 3b is a more detailed version of FIG. 3a;

FIG. 6 is a graphic user interface for user input of simulation parameters; and

DESCRIPTION OF SPECIFIC EMBODIMENTS OF THE INVENTION

In the present description the term 'camera' may be understood to mean a camera (such as a digital camera, or 'film' camera) operable to record moving images.

The lighting system may therefore be for a lighting system for videography, broadcasting, cinematography, studio filming and/or location filming.

Figure 1:
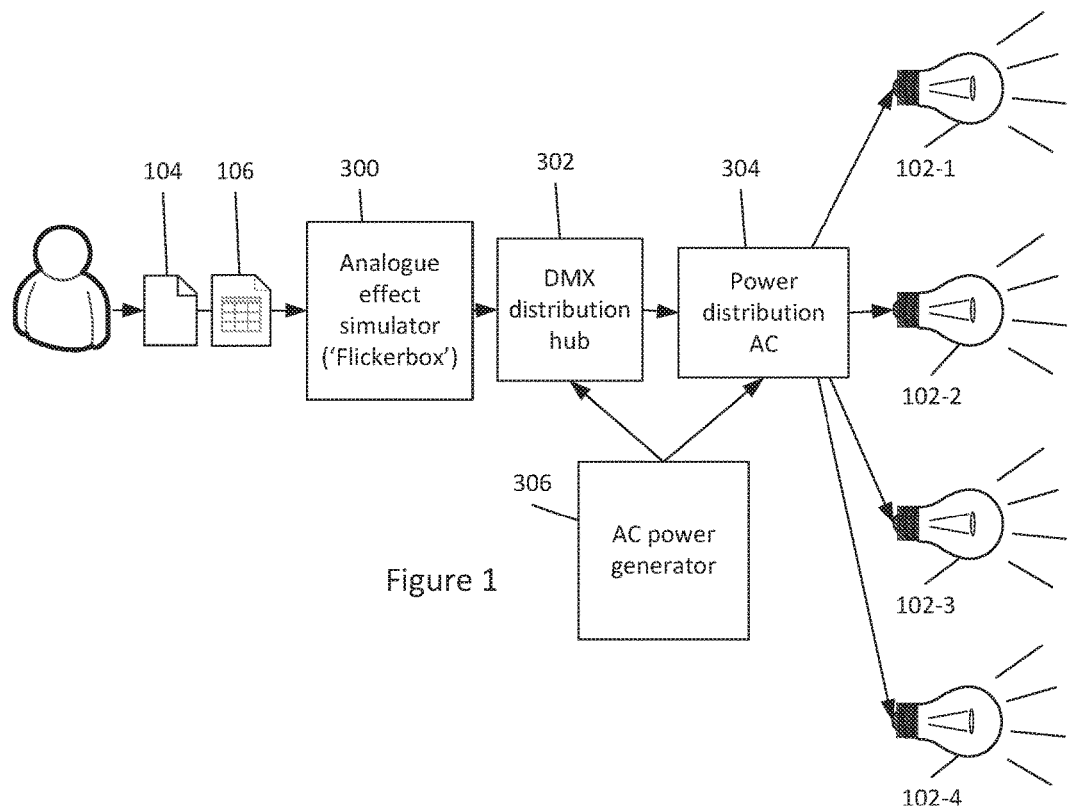
FIG. 1 is a schematic diagram of a 'flickerbox' lighting system.

FIG. 1 shows a schematic diagram of a 'flickerbox' lighting control system. The system comprises an analogue effect simulator, 300, a DMX distribution hub 302, an AC power generator 306, an AC power distribution module 302 and a plurality of incandescent lights 102. The analogue effect simulator 300 simulates a lighting effect such as fire, or electrical sparking based on various parameters 104. The analogue effect simulator 300 produces data 106 such as brightness parameters that vary over time for producing the desired lighting effect. The data 106 is used to modulate the light 102 such that the desired lighting effect is produced. The user has very limited ability to alter many of the parameters to adapt the lighting effect as desired.

Figure 2:
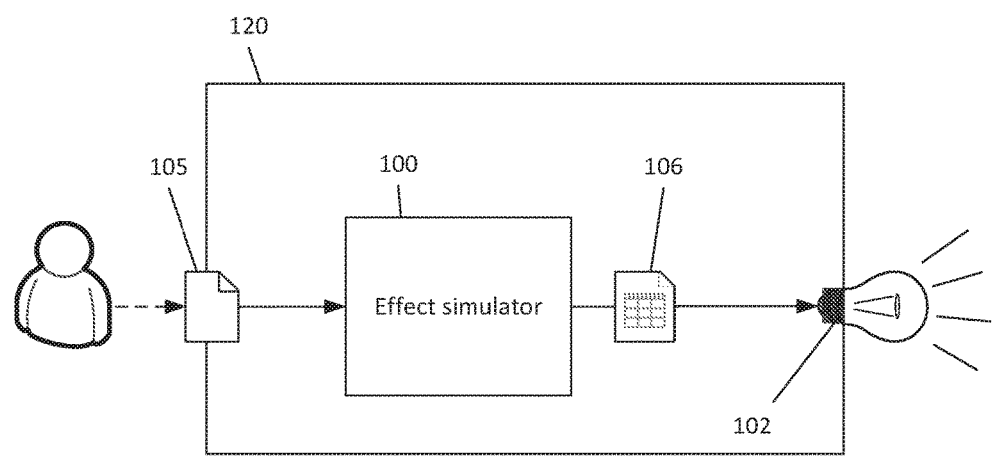
FIG. 2 is a schematic diagram of a further lighting system.

FIG. 2 schematically shows an example where a lighting effect simulator 100 and the light 102 are integrated in a single studio lamp device 120. In one example, the light 102 is an array of LEDs, preferably of differing colours. This arrangement does not require the DMX distribution hub 302, power elements 304, 306 as described above, and is more flexible in producing effects as will be described in more detail below. A microcontroller or other computing unit is integrated in the lamp device 120 for performing calculations.

An input interface 105 including a control panel is provided at a back panel of the lamp device 120. The control panel can include for example buttons, rotary knobs, sliders, and/or a display/input panel for user input of parameters for simulating an effect. In a variant a simple digital interface is provided on the light itself for user input of simulation parameters to control the lighting effect. In another variant the lamp device 120 is adapted for communication with a wireless user device and receives user-selectable simulation parameters to control the lighting effect from the user device. The user device may for example be a tablet or smart phone with suitable hardware / software (e.g. an app) for receiving user input of simulation parameters and transmitting that data to the light 102. The system of FIG. 2 is simpler to set up and less expensive than that of FIG. 1 as there are fewer pieces of hardware. Furthermore the energy inefficiency of 'hot light' systems (i.e. a 1K hot light consumes 1000 watt/hour, vs 38watt per hour of current generation LED system), Systems such as that described in FIG. 1 using a flicker box and typically 'hot lights' also suffer from the significant disadvantage that a hot light is a fixed colour of light, either daylight 5600K or most commonly tungsten 3200K. When recreating an effect such a lightning this effect would appear at the blue end of the colour spectrum i.e. 7000K+so utilising a 3200K light for this would require an operator to climb up a ladder to apply one or more CTB (Colour temperature blue) filter(s) to the light in order to achieve the desired colour temperature.

Having the ability to control the special FX from the light source, which in itself is a bi-colour LED Fixture also entirely eliminates that aspect of the process, the user can simply adjust the colour temperature from the back of the unit, with a visible numeric display of that number eliminating significant time from the process.

This is also a significant limiting factor in the creation of effects such as fire which typically burn blue on hotter peaks. It would be possible using an LED light source containing in built special effects to reproduce both the warm "orange" light output near the tungsten end of the scale, whilst also adding a "colour swing blue" on the peaks from the same light source, something that would not be possible using a legacy system.

Examples of user defined parameters that the light containing in built special effects can customize in simulating a lighting effect are now described in more detail:

Brightness: The peak luminance of the effect from 1% to 100% of the lamp's available luminance output.

Colour: For multicolour effects this sets the range of colours used over the spectrum of red, green and blue. For single colour effects it sets the colour temperature of the light.

Trigger: To start the effect running. For example, a manual trigger may be selected for manually triggering the start of a lightning burst, TV screen, or other effect.

Frequency: typically from 0.5 Hz to 50 Hz. This sets an average period between light peaks-e.g. a roaring fire may have a higher frequency than a single candle flame.

Depth: typically from 0% to 90%. This sets a base level of illumination of the effect. For example a fire may have a base level of 50% illumination superimposed on a level varying from 50% to 100% to simulate flickering flames.

Rolling Shutter Compensation: Film and TV cameras typically operate at frequencies between 24 Hz and 60 Hz. In order to provide consistent illumination during each camera frame, short time-period (e.g. stroboscopic) lighting effects should have a minimum pulse width which lasts at least one camera frame period. This parameter can be adjusted to suit the camera and frame rate.

'Colour Swing Blue' simulates the effect of flame going up the chimney, 'peaks' within the fire effect can be switched to transition between yellow and blue, to match the colour of a flame, creating a more dynamic and 3D fire effect. The brighter the 'spark' the more blue the light output is. The colour of the output is therefore dependent on the brightness of the output (or vice versa).

Further examples of lighting effects are for example to mimic television screen flicker, cinema illumination, illumination in a vehicle passing through a tunnel, or any situation where the lighting varies over time in a characteristic manner. A simulation can be defined that represents the characteristics of the lighting effect, and suitable random parameters can be used to introduce a realistic variance in the lighting effect.

In a variant the simulator operates with pre-defined parameters and random numbers, without further user input of parameters. This can still provide a realistic lighting effect, albeit with less adaptation to the user's preferences.

Figure 3A:
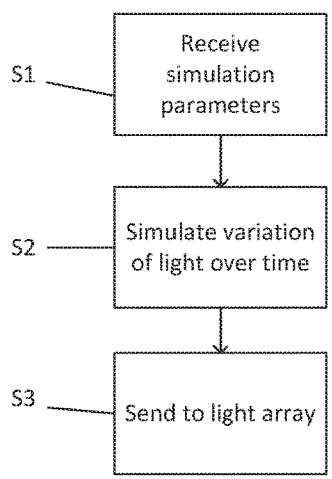
FIG. 3a is a flow diagram of a method for adjusting a lighting device.
Figure 3B:
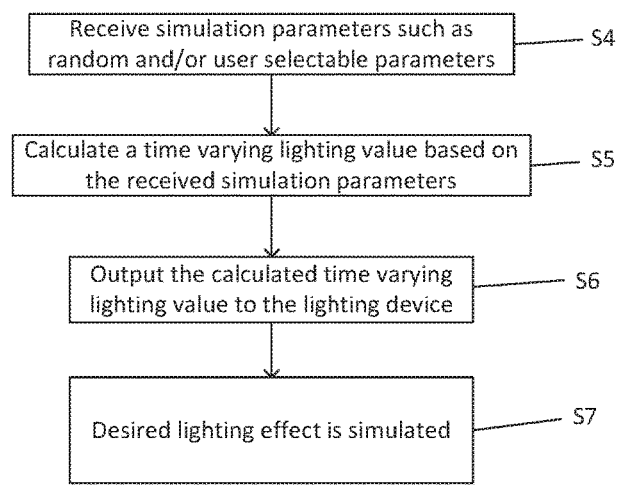

FIG. 3a illustrates a simple example of a method for simulating a lighting effect. FIG. 3b illustrates in more detail the method for simulating a lighting effect In a first step S1 simulation parameters are received, such as random parameters and/or user-selectable parameters as shown in step S4. Where a random parameter is algorithmically generated it is only pseudo-random, but for the purposes of the simulation a pseudo-random parameter is sufficiently random for realistic simulation and is hence considered to be equivalent to a truly random parameter. In a second step S2 a simulation is performed based on a simulation model and the received parameters. The nature of the simulation model can vary greatly, depending on the lighting effect that is desired and the sophistication of the desired simulation. As shown in S5, the simulation calculates how the lighting changes over time in order to produce the desired lighting effect. Following simulation in a third step S3 the lighting information determined by the simulation is output, for example to a lighting device, as shown in step S6, in order to produce the desired lighting effect as shown in step S7.

Figure 4:
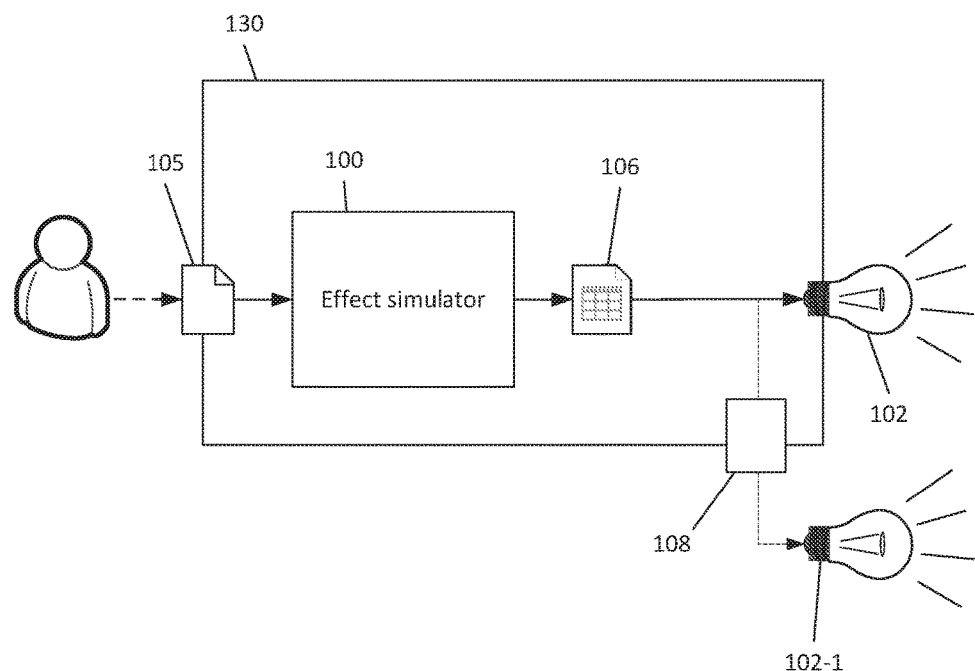
FIG. 4 is a schematic diagram of a further lighting system.

FIG. 4 schematically shows an example showing a master light source 102 built into a lighting control unit 130 and a 'slave' light source 102-1 separate from the lighting control unit. The lighting effect simulator 100 creates data 106 characterising a lighting effect and controls the master light 102 as described above. The data 106 is transmitted to the slave light 102-1 via (for example) a serial communication interface (e.g. RS232, USB or DMX) or by wireless transmission (e.g. Wi-Fi ®, Bluetooth ®Zigbee®, or via a mobile communication network utilising protocols such as GSM (Groupe Special Mobile) 3GPP (3$^{rd}$ Generation Partnership), or 4G LTE (Long term evolution)) via a wireless communication interface 108. The additional 'slave' light source 102-1 thereby allows the production of a lighting effect with more than one light device but without duplication of controllers 130. Such additional light sources can for example increase the area of illumination or increase the power of the lighting effect.

Figure 5:
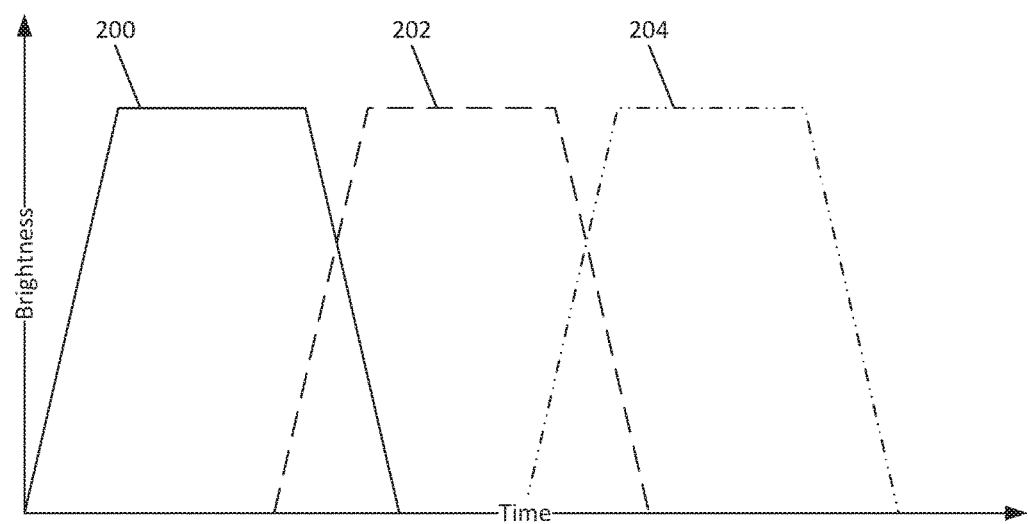
FIG. 5 shows a time/brightness plot for a system of linked lights.

The use of multiple lights 102 affords additional options for producing advanced effects. FIG. 5 shows a time/brightness plot of a 'chase' effect. In this example, three lights produce outputs 200, 202 and 204 separated in time. In such a way, an effect of a light source (such as a passing car) can be replicated. The relative timing of the light sources can be adjusted depending on the relative location of the sources, and the speed of the effect to be replicated. It should be noted that the 'fade up' and 'fade down'portions of each light output 200, 202, 204 overlap with one-another to more accurately replicate the effect of a moving object, as opposed to a element jumping from one location to another.

Related effects utilising similar timing controls are be 'paparazzi' of multiple flashes coming from different locations, or a 'propeller' simulating a light source being obscured by a rotating propeller. The use of a single controller 130 may be used to control all of the lights 102 so as to ensure an appropriate delay (or absence of delay).

FIG. 6 shows an example of a graphic user interface 800 for user input of simulation parameters. In the illustrated example the lighting effect to be simulated is a fire effect. The user can select a fire activity (with a slider positioned from 'low'to 'high') to set a frequency parameter as described above; a fire colour; a peak brightness; a baseline brightness to set a depth parameter as described above; and a camera frequency. A wide range of further parameters can be provided for user input, for example if the fire activity, brightness and/or colour is to change over time (to mimic a fire dying down and reducing to embers or to mimic addition of fuel to a fire). The user may also be provided with an option of superimposing different types of lighting effects, for example to mimic candlelight during a lightning storm.

In one example, the rolling shutter compensation controls a minimum light pulse to match the shutter speed or frame rate of the user's camera (camera frequency) to ensure even illumination across the frame and eliminate possible strobing. Therefore, the duration of the light pulse is longer than one period of the camera's recording frequency, or in other words, the lighting value varies at a lower frequency than the frequency of the camera.

The lighting effect simulator 100 typically provides data 106 in the form of brightness and/or colour values that vary over time. In order to cause the light 102 to produce the desired effect a lighting data converter may convert the data 106 from the lighting effect simulator 100 into a suitable signal for a particular light 102. For example for a light emitting diode (LED) array lighting the data conversion occurs at an LED lamp control logic that produces and supplies a separate pulse-width-modulation output for each LED colour to an LED drive circuit. A lighting data converter may be provided separately from the lighting effect simulator 100 and the light 102 or it may be integrated with one or the other or both.

The light 102 in one example comprises an array of different types of LEDs, preferably red, green, blue and white LEDs, or a bi colour fixture comprising warm typically 2800K LEDs and 'cool' 7000K LEDs which blend together to create a range of colour from 3200-6300K. The array may be a panel, flood light, spot light, a cluster or any other arrangement of LEDs. This provides the ability for the lighting to produce light of any visible colour by varying the relative intensities of the different LEDs. The lighting may alternatively be a filament (incandescent), halogen or other type of lighting.

The simulation may be performed on the fly, with lighting data values output from the simulator 100 to the light 102 in near-real time, or the simulation may be performed in advance and the lighting data values output for storage and later use to enable quick reproduction on set or location.

The lighting control system can reduce the number of devices required to provide lighting effects, especially where the lighting effect simulator is integrated in a light. This can significantly reduce equipment costs and time required to set up equipment. The system is also more portable allowing power from its on internal power source or battery instead of requiring an external power generator or mains powered solution. The lighting control system can be used for studio and location filming lighting systems, and more generally for videography, broadcast and/or cinematography.

A non-exhaustive list of example effects that may be produced by the system are as follows:

Strobe—The strobe range in one example is from 1 hz up to 4 hz. The last used strobe parameters are stored in non-volatile memory (which applies to any effect described herein). A user may rotate a knob on the device to adjust the 'duty cycle' (flash duration) to eliminate issues with rolling shutter cameras.

Lightning—this effect simulates lightning in a random manner, but a user may control the speed at which the lighting bursts re-occur. This effect is most realistic if the brightness is set to 100% and colour temperature is set at 6000K. A user may rotate a knob on the device to adjust the 'duty cycle' (flash duration) to eliminate issues with rolling shutter cameras. The duration of the lightning flashes in one example is 20 ms. The lightning strikes in one example come in bursts of between 2 and 8 random length pulses.

Throb—Throb is a regular smoothly pulsing light

Weld—this effect replicates a welding arc.

Colour cycle—This is a regular smoothly pulsing light which fades between the tungsten and blue LEDs Fire—this effect replicates a fire with 'dancing flames' as is described in more detail below.

Police—This effect is an emulation of an emergency services light, and may be most realistic in blue light.

Television—This effect is an emulation of someone watching TV.

It should be appreciated that due to the nature of the light 102, the effects may be customised by a user, for example, the frequency/speed, peak/minimum brightness or colour/colour temperature may be dynamically changed, and/or made to vary over time in a customised manner. Such user-customised effects may be stored and recalled at a later time. The effects may be triggered on cue (for example from a director) by sending a signal over a wired remote trigger or wireless device.

It should also be appreciated that multiple effects may be emulated simultaneously, for example, fire and lightning may be present simultaneously using a single lighting unit.

An example of a simulation for producing a fire effect is now described in more detail.

Fire is simulated as a series of 'sparks'. Each spark has the following random parameters:

Interval: New sparks are generated at an interval which varies randomly between a defined maximum and minimum interval.

Peak: The peak luminance of each spark varies randomly between a defined minimum and maximum.

Ramp-up time: The luminance of each spark ramps up to the peak at a randomly generated rate.

Fade-down time: The fade from the peak is linked to the ramp-up time but is much slower—simulating the gradual decline in luminance of a burning ember.

If the interval is short with respect to the ramp-up and fade-down time, then sparks can overlap in time—in which case the brightest spark determines the lamp luminance.

The lighting effect simulator 100 typically cycles round a loop calculating new lamp brightness and colour values. Alternatively the calculation can be triggered by an interrupt generated by a timer. The calculation is typically performed every 250μs.

The duration of each spark can be controlled by choosing whether or not to perform a new brightness calculation based on the value of a counter which is decremented every time an interrupt occurs. When the counter reaches zero it is either reset to its previous start value or, for a new spark, a new count start value is randomly generated. In this way each spark has a different speed, duration and peak—simulating the look of a real flame.

Generating the light output with the simulation provides a greater level of user adjustment and control than that produced by simply sampling the intensity of a real flame and replaying it at different speeds.

An example sequence of instructions for the simulation is as follows:

At the end of a spark up and down period:
 Reset duration for next spark to between 2.5 s to 5 s
 Generate new brightness targets for the next spark between 12.5% and 100% of current maximum brightness setting.
 Offset the random brightness targets by the requested brightness floor value
 Set the new peak brightness target for the new spark
 Ensure the new targets are greater than the existing faded brightness value to prevent downward jumps
 Set the fade direction to UP
Start new animation frame:
 Calculate brightness fade step sizes:
  Fade up fast, progressively larger fade step sizes
  Change fade direction at peak
  Fade down slow, progressively smaller fade step sizes
 Set the frame rate for the new spark to a random value
  prevent the curtailment of a long fade by a new short pulse: if the faded brightness is still >25% of max then don't allow new FramePeriod to be less than old.

Figure 7:
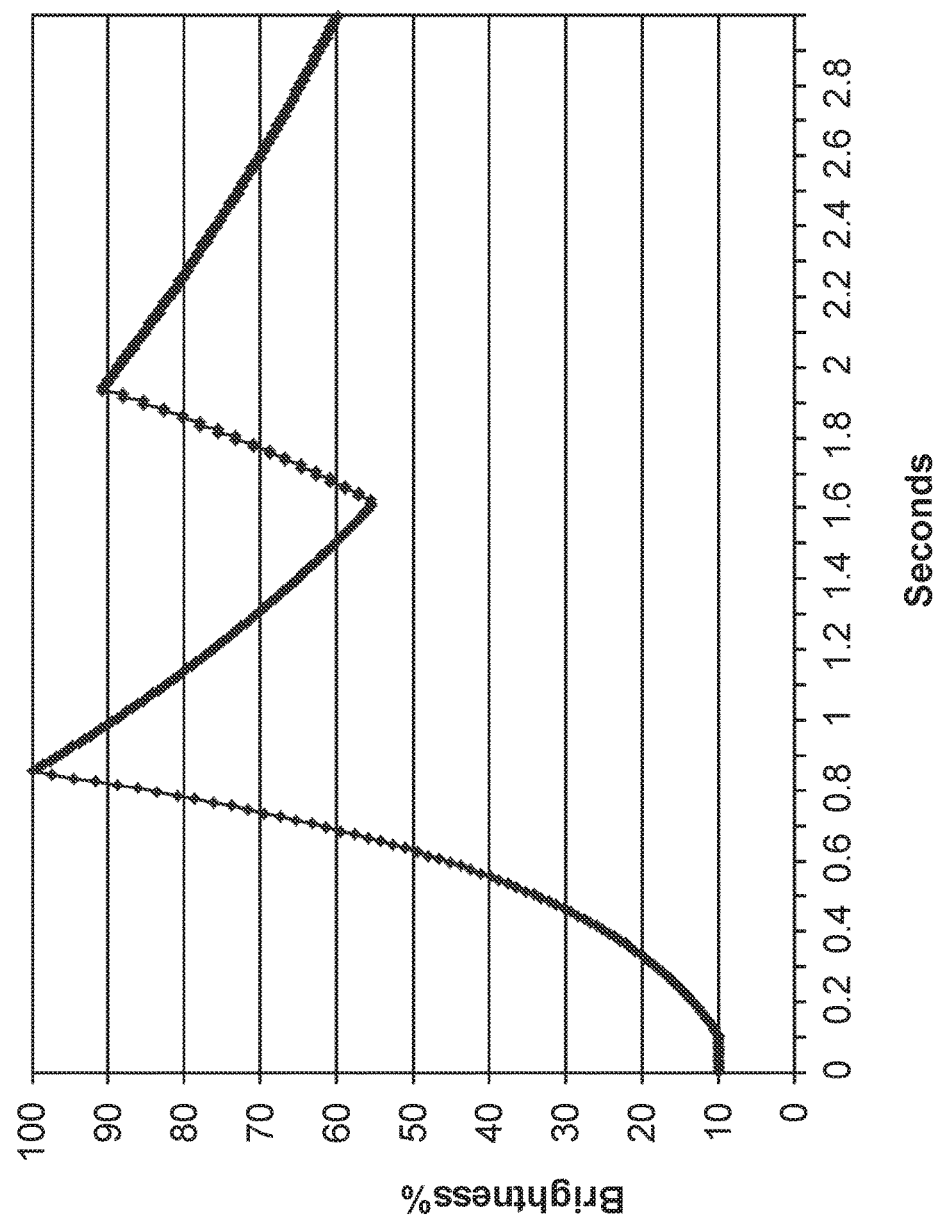
FIG. 7 is a graph of light brightness over time.

FIG. 7 shows an example of the brightness varying over time produced according to a simulation as described above. Two peaks can be seen, one reaching 100% intensity and the other reaching 91% intensity. The first peak fades up from 10% to 100% in 0.85 seconds, and back down to 56% in 0.75 seconds. The second peak fades up from 56% to 91% in 0.33 seconds, and back down to 60% in 1.07 seconds. The fade up starts shallower and becomes steeper as it progresses. The fade down starts steep and becomes shallower as it progresses. A toggle switch is also shown which toggles between 'Colour Swing Blue' and 'Monochrome'. Colour Swing Blue represents modifying the colour of peaks in brightness so as to replicate the increased temperature of sparks in a fire, Monochrome may be used when (for example) filming in black and white, or when altering colour of the effect may have deleterious effects on other elements of the scene (for example, rendering text difficult to read).

An example of a simulation for producing a lightning effect is now described in more detail. Lightning is simulated as a sequence of 'bursts' or groups of flashes. The number of flashes in each burst, the delay between bursts, the delay between each flash within the burst, and the amplitude of each flash are all set randomly within certain boundaries. The minimum 'on' time period of each flash can be set by the user to ensure full illumination of the camera frame. The lamp can also be set into a mode where a burst of flashes is triggered by the push of a button. In this way the effect can be triggered on demand by the user.

An example sequence of instructions for the simulation of lightning, with a series of bursts of flashes, is as follows:

At the end of a burst of flashes recalculate the parameters for the next burst:
  Reset the number of flashes in a burst to a random number between 2 and 10
  Reset the period to next burst to a random number between 2.5 and 5 s. Calculate parameters for each flash in a burst of flashes:
  Randomly modulate brightness of each flash slightly
  Reset the time to next flash to a random number between 8 ms and 220 ms
  Reset the 'on' flash duration to a random number between 8 ms and 120 ms
    ensure a minimum off-period is maintained between flashes
  For the final flash set the duration to a random number between 10 ms and 113 ms.

The lighting system, lighting effect simulator, lighting controller, lighting device, computing device, and/or computer program product may have one or more of the following features:
  built-in capability to generate a range of cinematic special effects by modulating the colour and brightness of the light output.
  the parameters of the effects can be controlled via a simple user interface on the lamp itself.
  the parameters of the effects can be controlled remotely via WiFi or DMX from a smart phone or tablet.
  networked with other lights to produce a synchronised large area special effect.
  minimum light pulse width can be adjusted to suit the shutter speed or frame rate of the user's camera to ensure even illumination across the frame.

Various other modifications will be apparent to those skilled in the art. It will be understood that the present invention has been described above purely by way of example, and modifications of detail can be made within the scope of the invention. For example, it should be appreciated that the effect simulator 100 or the computing device 130 may be separate from any light 102, and connectable to lights 102, by either a wired or wireless connection.

The lighting effect simulator 100 may be provided by way of a suitably adapted computing device such as a PC, tablet or smart phone, with suitable software for user input of simulation parameters. The computing device may be a suitably adapted light controller device with suitable controls for user input of simulation parameters Reference numerals appearing in the claims are by way of illustration only and shall have no limiting effect on the scope of the claims.

What is claimed is:

1. A method for controlling a lighting device to produce a user customisable lighting effect, the method comprising:
    calculating, using an effect simulator, a time varying lighting value based on at least one simulation parameter; wherein said at least one simulation parameter characterises a user customisable lighting effect selected from a range of different user customisable lighting effects for at least one of: videography, broadcasting, cinematography, studio filming, and location filming; wherein said at least one simulation parameter is at least one of: a random brightness; a random duration; and a random interval; said simulation parameter depending on the user customisable lighting effect being simulated; and
    outputting, from said effect simulator, said time varying lighting value thereby to simulate the user customisable lighting effect.

2. The method according to claim 1 wherein the random brightness comprises a random peak brightness.

3. The method according to claim 1 wherein the random interval comprises at least one of a random interval between flashes, a random interval between groups of flashes, and a random frequency.

4. The method according to any claim 1 wherein the random duration comprises at least one of a random ramp-up time to peak brightness, a random fade-down time from peak brightness, and a random number of pulses.

5. The method according to claim 1 wherein said at least one simulation parameter is random within predefined boundaries and wherein the predefined boundaries comprise at least one of an upper and lower duration; a number of flashes in a burst; an interval between bursts; an amplitude; and a ramp-up or fade-down time.

6. The method according to claim 1 wherein the at least one of: a random brightness; a random duration; and a random interval is determined in dependence on one or more user-selectable simulation parameters.

7. The method according to claim 1, wherein the simulation parameter is related to one or more of: a rate of increase of brightness; a rate of decrease of brightness; a rate of change of colour; a brightness; a local maximal brightness; a local minimal brightness; a brightness fluctuation period; and a colour fluctuation period.

8. The method according to claim 1 further comprising receiving a user input of one or more user-selectable simulation parameters and adapting the simulation in dependence on the one or more user-selectable simulation parameters.

9. The method according to claim 1 wherein the simulation parameter comprises at least one of: a maximum brightness; a minimum brightness; a colour; and a trigger.

10. The method according to claim 1 wherein the simulation iterates through repeated cycles of calculating a time varying lighting value based on at least one random simulation parameter and simulating the user customisable lighting effect.

11. The method according to claim 1 wherein the user customisable lighting effect is designed to mimic at least one of fire flickering; police light; television; lightning flashing; electrical sparking; fireworks; a neon flickering sign; a gunshot; welding; a scan; a propeller; a (nuclear) explosion; a wormhole; paparazzi flashes; flashes (strobe).

12. The method according to claim 1, further comprising selecting a definition of a trigger event, said trigger event initiating said output of the time varying lighting value thereby to simulate the user customisable lighting effect.

13. The method according to claim 1, further comprising storing the at least one simulation parameter corresponding to said user customisable lighting effect.

14. The method according to claim 1 comprising controlling a plurality of lights in dependence on the output.

15. A controller adapted to control at least one lighting device to produce a user customisable lighting effect, the controller comprising:
    an effect simulator adapted to calculate a time varying lighting value based on at least one simulation parameter; wherein said at least one simulation parameter characterises a user customisable lighting effect selected from a range of different user customisable lighting effects for at least one of: videography, broadcasting, cinematography, studio filming, and location filming; wherein the at least one simulation parameter is at least one of: a random brightness; a random duration; and a random interval; said simulation parameter depending on the user customisable lighting effect being simulated; and wherein an output of the effect simulator is adapted to control a lighting device according to the calculated variation of lighting over time.

16. The controller according to claim 15, wherein the controller comprises a wired or wireless communication interface adapted for communication with one or more lighting devices.

17. The controller according to claim 15, wherein the controller comprises an input interface adapted to receive a user input.

18. A lighting system comprising the controller according to claim 15 and at least one lighting device; said lighting device comprising at least one light emitting diode.

19. The lighting system according to claim 18 wherein said controller and said lighting device are integrated in a combined unit.

20. A computer program comprising software code for controlling a lighting device to produce a user customisable lighting effect, the computer program adapted to perform, when executed, the steps of:

calculating using an effect simulator a time varying lighting value based on at least one simulation parameter; wherein said at least one simulation parameter for characterises a user customisable lighting effect selected from a range of different user customisable lighting effects for at least one of: videography, broadcasting, cinematography, studio filming, and location filming; wherein the at least one simulation parameter is at least one of: a random brightness; a random duration; and a random interval; said simulation parameter depending on the user customisable lighting effect being simulated; and outputting, from said effect simulator, said time varying lighting value thereby to simulate the user customisable lighting effect.

21. The method according to claim 13, further comprising recalling said stored at least one simulation parameter from a memory.

\* \* \* \* \*